(12) United States Patent
Leising et al.

(10) Patent No.: US 6,800,049 B2
(45) Date of Patent: Oct. 5, 2004

(54) CONTINUOUSLY VARIABLE TRANSMISSION WITH IMPROVED RESPONSE TIME

(75) Inventors: Maurice B Leising, Clawson, MI (US); Steven A Mikel, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/378,177

(22) Filed: Mar. 3, 2003

(65) Prior Publication Data

US 2004/0176212 A1 Sep. 9, 2004

(51) Int. Cl.[7] .............................................. B60K 41/12
(52) U.S. Cl. ........................................................ 477/39
(58) Field of Search ............................. 477/39, 48, 46

(56) References Cited

U.S. PATENT DOCUMENTS

| | | | |
|---|---|---|---|
| RE31,361 E | 8/1983 | Smirl | |
| 4,526,557 A | * 7/1985 | Tanaka et al. | ................. 474/18 |
| 6,193,040 B1 | 2/2001 | Cerny | |
| 6,270,440 B1 | 8/2001 | Adeyemi et al. | |
| 6,345,223 B1 | 2/2002 | Takizawa et al. | |

\* cited by examiner

*Primary Examiner*—Dirk Wright
(74) *Attorney, Agent, or Firm*—Thomas A. Jurecko

(57) ABSTRACT

A method and arrangement for controlling a continuously variable transmission with improved response time, the continuously variable transmission having a first pulley engagable with an engine and having a second pulley drivingly connected to the first pulley by a belt. The first and second pulleys each have a fixed sheave and a movable sheave, a position of the movable sheaves defining a transmission ratio. The method and arrangement provides for disengaging the engine from the first pulley and increasing the speed of the engine to a target speed, reducing pressure to the movable sheave of the first pulley to a low value, increasing pressure to the movable sheave of the second pulley causing it to rapidly move to a new position thereby changing the transmission ratio to a target transmission ratio, increasing the pressure to the first pulley, and reengaging the engine to the first pulley.

16 Claims, 3 Drawing Sheets

_US 6,800,049 B2_

CONTINUOUSLY VARIABLE TRANSMISSION WITH IMPROVED RESPONSE TIME

FIELD OF THE INVENTION

The present invention relates to continuously variable transmissions and more particularly to a method for rapidly changing the transmission ratio.

BACKGROUND OF THE INVENTION

Continuously variable transmissions (CVT's) have been known in the art for a number of years. A typical continuously variable transmission is disclosed in U.S. Pat. No. 4,241,618 to Smirl, reissued as No. 31,361. One type of a continuously variable transmission typically includes a primary pulley and a secondary pulley, each pulley having a fixed sheave and a movable sheave. A belt is drivingly connected between the primary and secondary pulleys. Engine torque is provided to the primary pulley which transfers the torque through the belt to the secondary pulley. In order to obtain a new transmission ratio, pressure to one of the movable pulley sheave's is decreased while pressure to the other movable pulley sheave is increased. This imbalance of pressure forces the belt clamped between these sheaves into a higher or lower transmission ratio as required.

There are some limitations with current continuously variable transmission technology. A conventional continuously variable transmission system has a slow response time when the driver of the vehicle opens the throttle quickly, thus calling for a rapid change in the transmission ratio. Because conventional CVT control systems have dictated that the primary pulley pressure must be maintained high enough to prevent slippage of the belt, the rate of change of the pressure ratio between the primary pulley and the secondary pulley is limited. This limited change in the pressure ratio limits the rate at which the continuously variable transmission ratio changes, thereby creating a delay in the continuously variable transmission response time. Therefore, it is an objective of the present invention to provide an improved method for rapidly changing the transmission ratio in a continuously variable transmission.

SUMMARY OF THE INVENTION

The method according to the present invention includes providing a continuously variable transmission having a first pulley engagable with an engine by a clutch device and a second pulley drivingly connected to the first pulley by a belt mounted between the first pulley and the second pulley. The first and second pulleys each have a fixed sheave and a movable sheave, a position of the movable sheaves of the first and second pulleys defining a transmission ratio. When a rapid transmission ratio change is required, the engine is disengaged from the first pulley by disengaging the clutch device. This allows the engine to use almost all of its power to rapidly achieve a target speed corresponding with the vehicle speed and the target transmission ratio. The clamping pressure on the first pulley is reduced to a very low value to allow rapid movement to a new ratio. Enough pressure is maintained on the first pulley so as to prevent excessive belt slip. The position of the movable sheave of the second pulley is then rapidly moved to a new position for obtaining a target transmission ratio. The movable sheave of the first pulley then receives increased clamping pressure which allows it to carry full engine torque. Finally, the engine is reengaged to the first pulley by reengaging the clutch device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
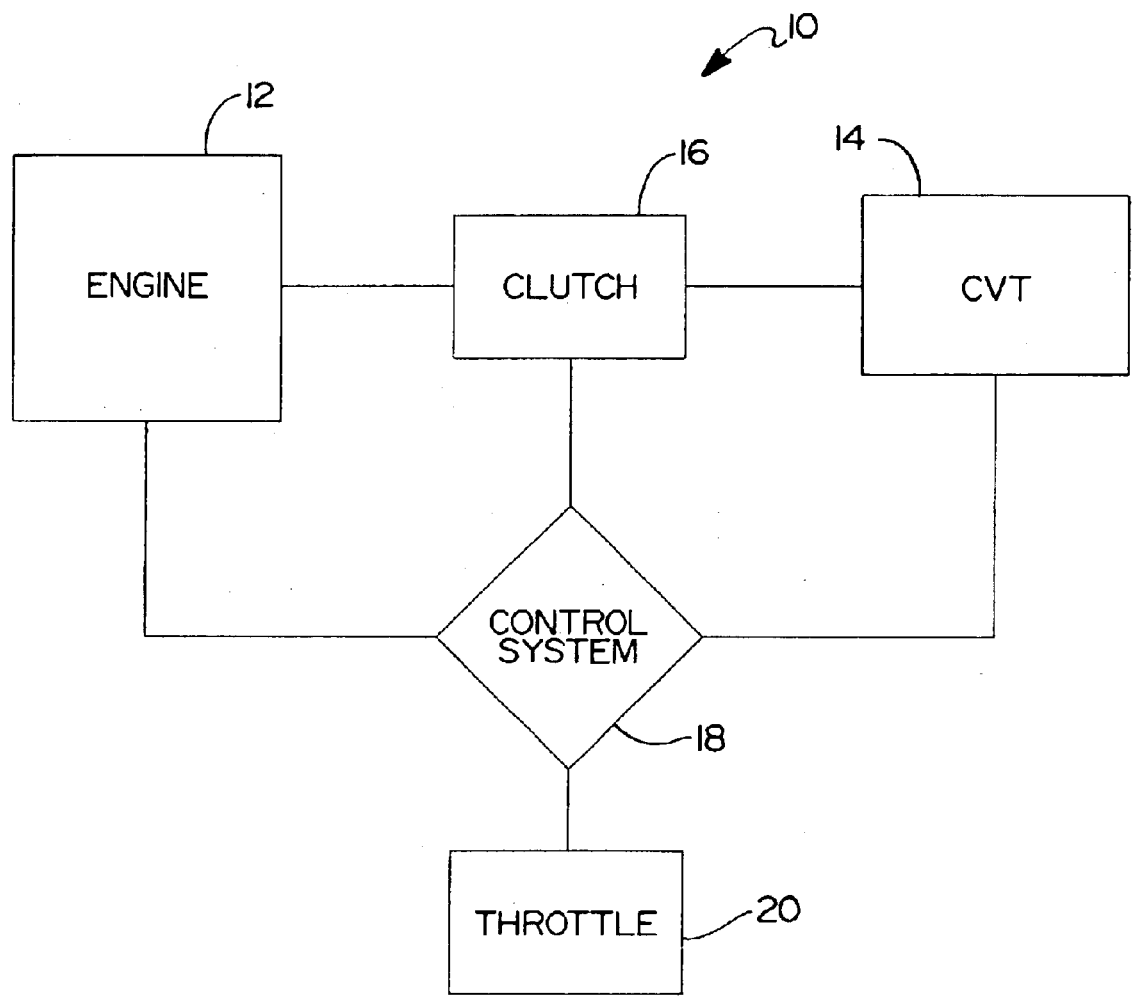
FIG. 1 is a schematic view of a vehicle powertrain having a continuously variable transmission according to the principles of the present invention.

Referring now to FIG. 1, a schematic view of a vehicle powertrain 10 is provided having an engine 12 drivingly connected to a continuously variable transmission (hereinafter CVT) 14 by a clutch device 16. The engine 12, CVT 14, and clutch device 16 are controlled by a control system 18 that receives signals from a throttle position sensor 20. The control system may be either a unitary engine/transmission controller or a separate engine controller and transmission controller. The control system 18 may receive other vehicle condition data such as engine speed, vehicle speed, and/or vehicle braking conditions. The control system 18 uses real-time spark control to regulate the speed of the engine 12. The control system 18 may also or alternatively use an electronic throttle control and/or fuel injector control to regulate the speed of the engine 12. The control system 18 is connected to the clutch device 16 for engagement and disengagement of the clutch device 16. The clutch control can be obtained by hydraulic or electro-mechanical systems as is known in the art. Exemplary clutch control systems are disclosed in U.S. Pat. Nos. 6,345,223 and 6,193,040 which are each herein incorporated by reference. The control system 18 is also connected to the CVT 14 for controlling a transmission ratio. The CVT control is preferably obtained by a hydraulic control system as is known in the art.

Figure 2:
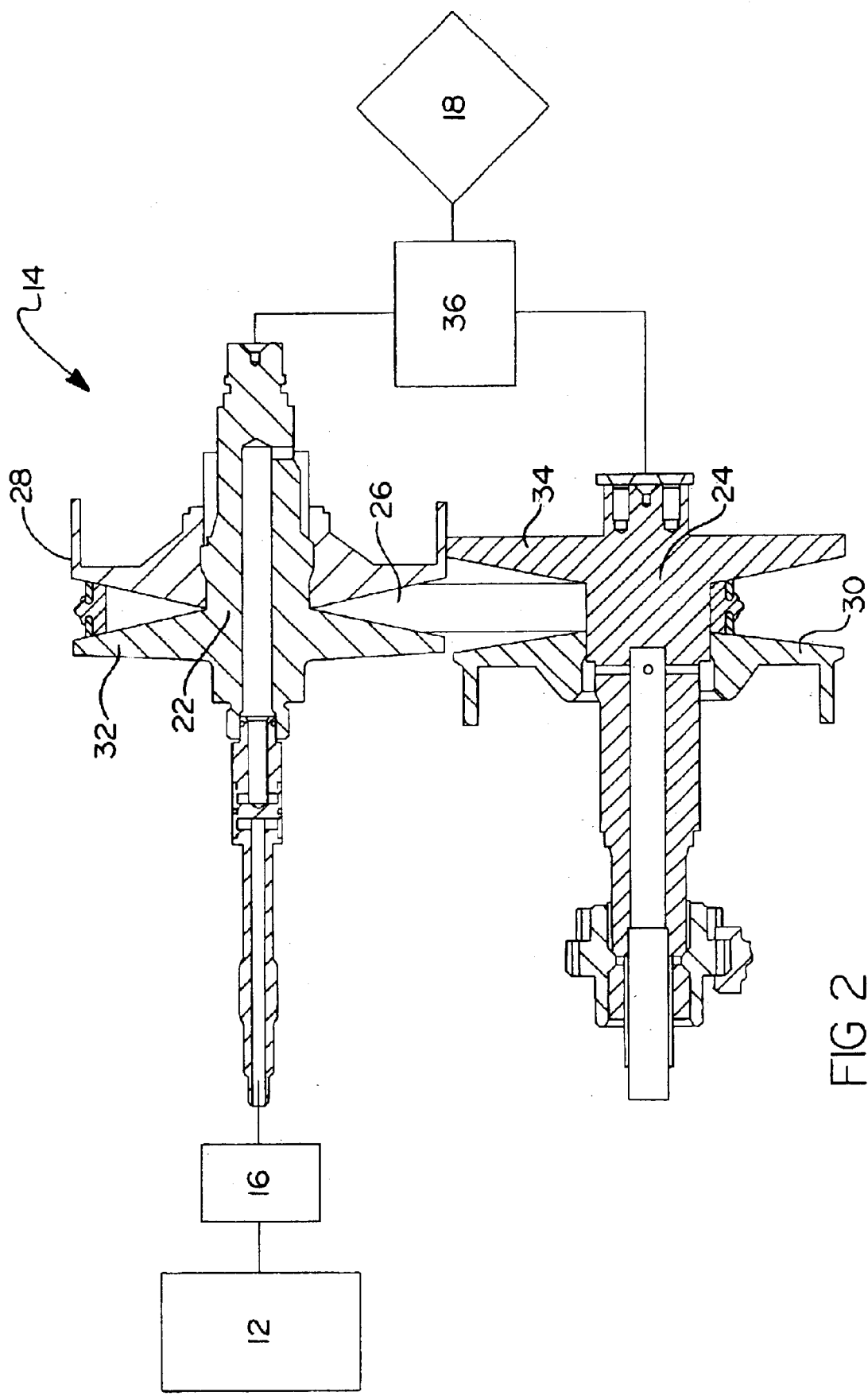
FIG. 2 is a detailed schematic view of a continuously variable transmission according to the principles of the present invention.

With reference to FIG. 2, the CVT 14 includes a first pulley 22 drivingly connected to a second pulley 24 by a belt 26. For purposes of this disclosure, the belt may include a chain to drivingly connect the first pulley 22 to the second pulley 24. The engine 12 is drivingly connected to the first pulley 22 through the clutch device 16. The first and second pulleys 22, 24 each have movable sheaves 28, 30 and fixed sheaves 32, 34, respectively. The movable sheaves 28, 30 are capable of translation along the axis of rotation of the first and second pulleys 22, 24. The movable sheaves 28, 30 are actuated by a hydraulic control system 36 in response to control signals from the control system 18. In any given lateral position the movable sheaves 28, 30 define a transmission ratio for the CVT 14.

During normal operation of the vehicle powertrain 10, the engine 12 transmits torque through the clutch device 16 to the first pulley 22, which transmits torque through the belt 26 to the second pulley 24. The second pulley 24 transmits this torque to a drive axle or transaxle system (not specifically shown), thereby providing power to the vehicle.

Figure 3:
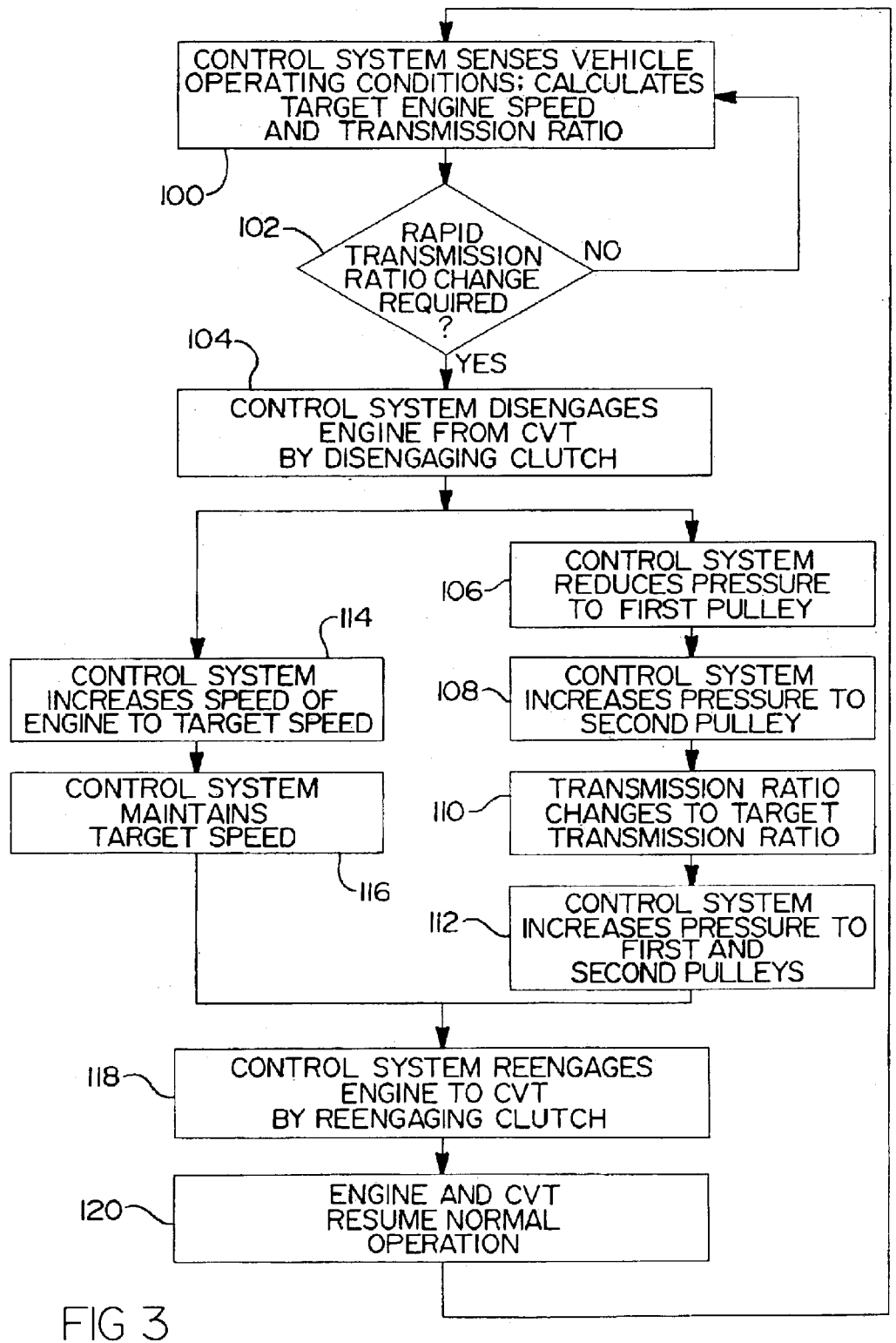
FIG. 3 is a flow chart detailing the method of rapid transmission ratio change according to the principles of the present invention.

With reference to FIG. 3, a flow diagram is provided detailing the method of rapid transmission ratio change in accordance with the principles of the present invention. The control system 18 senses vehicle operating conditions and calculates a target engine speed and a target transmission ratio based on those operating conditions at step 100. The control system 18 then determines whether a rapid transmission ratio change is required to achieve the target transmission ratio at step 102. In the preferred embodiment, rapid transmission ratio change is required if the throttle position sensor 20 signals the control system 18 requesting more than a specific acceleration. Alternate criteria for determining the need for a rapid transmission ratio change may include braking conditions or engine speed. If a rapid transmission ratio change is required, then the control system 18 disengages the engine 12 from the first pulley 22 of the CVT 14 by disengaging the clutch device 16, shown in step 104. The disengagement is preferably not complete; rather it allows slip, but still transmits some torque to the first pulley. If no rapid transmission ratio change is needed, then the control system 18 continues normal operations including sensing vehicle operating conditions and calculating target engine speeds and transmission ratios.

Disengagement of the clutch device 16 at step 104 reduces the torque from the engine 12 to the first pulley 22 and therefore to the belt 26. The control system 18 then provides a signal to the hydraulic control system 36 to reduce hydraulic pressure to the first pulley 22, shown at step 106. This allows the movable sheave 30 to rapidly move the belt and movable sheave 28 to the target ratio position. In the preferred embodiment of the present invention, the hydraulic pressure to the first pulley 22 is reduced to a very low value such that enough pressure is maintained to the first pulley 22 to prevent possible drivetrain backlash of the belt 26. Hydraulic pressure is then increased to the second pulley 24 at step 108. The movable sheave 30 of the second pulley 24 moves to a downshift position, changing the transmission ratio to the target transmission ratio at step 110. The high pressure ratio between the second pulley 24 and the first pulley 22 results in a rapid transmission ratio rate of change. Once the target transmission ratio has been achieved, the pressure ratio between the second pulley 24 and the first pulley 22 is returned to a normal driving pressure sufficient to maintain the positions of the movable sheaves 28, 30 while providing torque transfer from the first pulley 22 through the belt 26 to the second pulley 24, show at step 112.

Simultaneously with steps 106, 108, 110, and 112 the control system 18 speeds up the engine 12 to the target engine speed, shown in step 114. At step 116 the target engine speed is maintained using real-time spark control and/or, electronic throttle control and/or fuel injector control. Once the engine 12 has reached the target engine speed and the CVT 14 has attained the target transmission ratio, the control system 18 reengages the engine 12 to the first pulley 22 of the CVT 14 by reengaging the clutch device 16, shown in step 118. Normal engine and CVT operations are then resumed at step 120 and the control system 18 resumes sensing vehicle operating conditions and calculating target engine speeds and transmission ratios in step 100.

Rapid transmission ratio change and reengagement of the clutch device 16 in step 118 can occur approximately 0.5 seconds after disengagement of the clutch device 16 in step 104. This allows for rapid downshifting of the CVT 14 when desired and improved vehicle response time. Alternatively, the above method may be used to achieve a rapid upshifting of the CVT 14 upon sensed vehicle conditions.

The above description of the invention is merely exemplary in nature and, thus, variations that do not depart from the general scheme of the invention are intended to be within the scope of the invention. Such variations are not to be regarded as a departure from the spirit and scope of the invention.

What is claimed is:

1. A method for controlling a continuously variable transmission for rapid acceleration, said continuously variable transmission having a first pulley engagable with an engine by a clutch device, a second pulley drivingly connected to said first pulley by a belt mounted between said first pulley and said second pulley, said first and second pulleys each having a fixed sheave and a movable sheave, a position of said movable sheaves of said first and second pulleys defining a transmission ratio, the method comprising:

disengaging said engine from said first pulley by disengaging said clutch device;

increasing a speed of said engine to a target engine speed;

reducing pressure to said movable sheave of said first pulley and increasing pressure to said movable sheave of said second pulley thereby changing said position of said movable sheaves of said first pulley and said second pulley to a downshift position for obtaining a target transmission ratio;

increasing pressure to said movable sheave of said first pulley to a pressure state such that said first pulley drives said second pulley at said target transmission ratio; and reengaging said engine to said first pulley by reengaging said clutch device.

2. The method of claim 1 wherein reengagement of said engine to said first pulley occurs within approximately 0.5 seconds after disengagement of said engine from said first pulley.

3. The method of claim 1 wherein said reduced pressure to said movable sheave of said first pulley is such that torque on said belt is sufficient to prevent drivetrain backlash.

4. The method of claim 1 wherein said movable sheaves of said first and second pulleys are actuated by hydraulic pressure.

5. The method of claim 4 wherein said first pulley is drivingly connected to said second pulley by a chain mounted between said first pulley and said second pulley.

6. A method for controlling a continuously variable transmission in a vehicle in response to sensed vehicle operating conditions, said vehicle having an engine, a continuously variable transmission having a first pulley engagable with said engine, a second pulley drivingly connected to said first pulley by a belt mounted between said first pulley and said second pulley, said first and second pulleys each having a fixed sheave and a movable sheave, a position of said movable sheaves of said first and second pulleys being controlled by a control system for obtaining different transmission ratios, said control system further controlling a speed of said engine, the method comprising:

sensing vehicle operating conditions and determining a target transmission ratio and a target engine speed;

disengaging said engine from said first pulley if said sensed vehicle operating conditions require a rapid transmission ratio change;

increasing said speed of said engine to said target speed;

rapidly reducing pressure to said first pulley and increasing pressure to said second pulley for adjusting said transmission ratio to said target transmission ratio;

increasing said pressure to said first pulley; and reengaging said engine to said first pulley.

7. The method of claim 6 wherein said control system uses real-time spark control to control a speed of said engine.

8. The method of claim 6 wherein said control system uses electronic throttle control to control a speed of said engine.

9. The method of claim 6 wherein said control system uses fuel injector control to control a speed of said engine.

10. The method of claim 6 wherein calculation of said target transmission ratio and said target engine speed by said control system is based on an acceleration demand of said vehicle operating conditions.

11. The method of claim 6 wherein said second pulley is drivingly connected to said first pulley by a chain mounted between said first pulley and said second pulley.

12. A vehicle comprising:

an engine;

a continuously variable transmission, said transmission having a first pulley engagable with said engine by a clutch device, a second pulley drivingly connected to said first pulley by a belt mounted between said first pulley and said second pulley, said first and second pulleys each having a fixed sheave and a movable sheave, a position of said fixed and movable sheaves defining a transmission ratio; and a control system having a throttle position sensor connected to said control system, said control system providing signals for controlling a position of said movable sheaves of said first and second pulleys, for controlling an engine speed of said engine and for controlling said clutch device;

wherein said control system calculates a target transmission ratio and a target engine speed, and when said target transmission ratio requires a rapid change, said control system disengages said engine from said first pulley by disengaging said clutch device, said control system increases said engine speed to a target speed, said control system rapidly reduces hydraulic pressure to said first pulley and increases hydraulic pressure to said second pulley so as to rapidly change said transmission ratio to said target transmission ratio and subsequently increasing hydraulic pressure to said first pulley, said control system then reengages said engine to said first pulley by reengaging said clutch device.

13. The method of claim 12 wherein said control system uses real-time spark control to control said engine speed.

14. The method of claim 12 wherein said control system uses electronic throttle control to control said engine speed.

15. The method of claim 12 wherein said control system uses fuel injector control to control said engine speed.

16. The method of claim 12 wherein said second pulley is drivingly connected to said first pulley by a chain mounted between said first pulley and said second pulley.

* * * * *